United States Patent [19]

Liou

[11] Patent Number: 5,375,441

[45] Date of Patent: Dec. 27, 1994

[54] LOCKING DEVICE FOR STEERING WHEEL

[76] Inventor: Gaieter Liou, No. 48, Ton-Hwa St., San-Min Dist, Kaohsiung, Taiwan, Prov. of China

[21] Appl. No.: 118,198

[22] Filed: Sep. 9, 1993

[51] Int. Cl.⁵ ............................................ B60R 25/02
[52] U.S. Cl. ...................................... 70/209; 70/226
[58] Field of Search ................. 70/209, 211, 212, 225, 70/226, 237, 238

[56] References Cited

U.S. PATENT DOCUMENTS

| | | | |
|---|---|---|---|
| 3,138,036 | 6/1964 | Carson | 70/211 |
| 4,103,524 | 8/1978 | Mitchell et al. | 70/209 |
| 4,970,884 | 11/1990 | Solow | 70/226 X |
| 5,052,201 | 10/1991 | Liou | 70/226 X |
| 5,055,823 | 10/1991 | Fuller | 70/211 X |
| 5,095,723 | 3/1992 | Lin | 70/238 X |
| 5,129,245 | 7/1992 | Chang | 70/209 |
| 5,138,853 | 8/1992 | Chen | 70/226 X |
| 5,197,308 | 3/1993 | Pazik | 70/209 |

FOREIGN PATENT DOCUMENTS 936144  7/1948  France .................... 70/212

*Primary Examiner*—Lloyd A. Gall
*Attorney, Agent, or Firm*—Jacobson, Price, Holman & Stern

[57] ABSTRACT

A locking device for locking a steering wheel of a vehicle includes a stick having a frame fixed on the middle portion for engaging with the steering wheel of the vehicle, a notch is formed in the frame, and a block is slidably engaged on the stick and has a catch engageable with the stick so as to lock the stick in place, the block includes an extension engaged with the notch of the frame so as to lock the steering wheel in place.

3 Claims, 3 Drawing Sheets

LOCKING DEVICE FOR STEERING WHEEL

BACKGROUND OF THE INVENTION

1. Field of the Invention

The present invention relates to a locking device, and more particularly to a locking device for a steering wheel of a vehicle.

2. Description of the Prior Art

Various kinds of locking devices for locking the steering wheel of the vehicles have been developed, however, the locking devices for locking the steering wheel include complicated configuration.

The present invention has arisen to mitigate and/or obviate the afore-described disadvantages of the conventional locking devices for steering wheel.

SUMMARY OF THE INVENTION

The primary objective of the present invention is to provide a locking device for locking the steering wheel which includes a simplified configuration.

In accordance with one aspect of the invention, there is provided a locking device for locking a steering wheel of a vehicle comprising a stick including at least one tooth formed in a first end thereof, a frame fixed on a middle portion of the stick for engaging with the steering wheel of the vehicle, the frame including a notch formed therein, a block slidably engaged on the first end of the stick and including a catch slidably disposed therein, an extension extended from the block and engaged with the notch of the frame when the block is moved toward the frame, the steering wheel being locked between the frame and the block when the extension of the block is engaged in the notch of the frame, and means biasing the catch upward to engage with the tooth of the stick so as to lock the steering wheel in place.

The stick includes an annular groove formed in the first end thereof, and a clamping ring engaged in the annular groove so as to prevent the block from disengaging from the stick The stick includes at least one orifice formed therein, and a sleeve engaged on the stick and having at least one hole formed therein, and at least one pin engaged in the hole of the sleeve and the orifice of the stick so as to fix the sleeve on the stick.

Further objectives and advantages of the present invention will become apparent from a careful reading of the detailed description provided hereinbelow, with appropriate reference to the accompanying drawings

DETAILED DESCRIPTION OF THE PREFERRED EMBODIMENT

Figure 1:
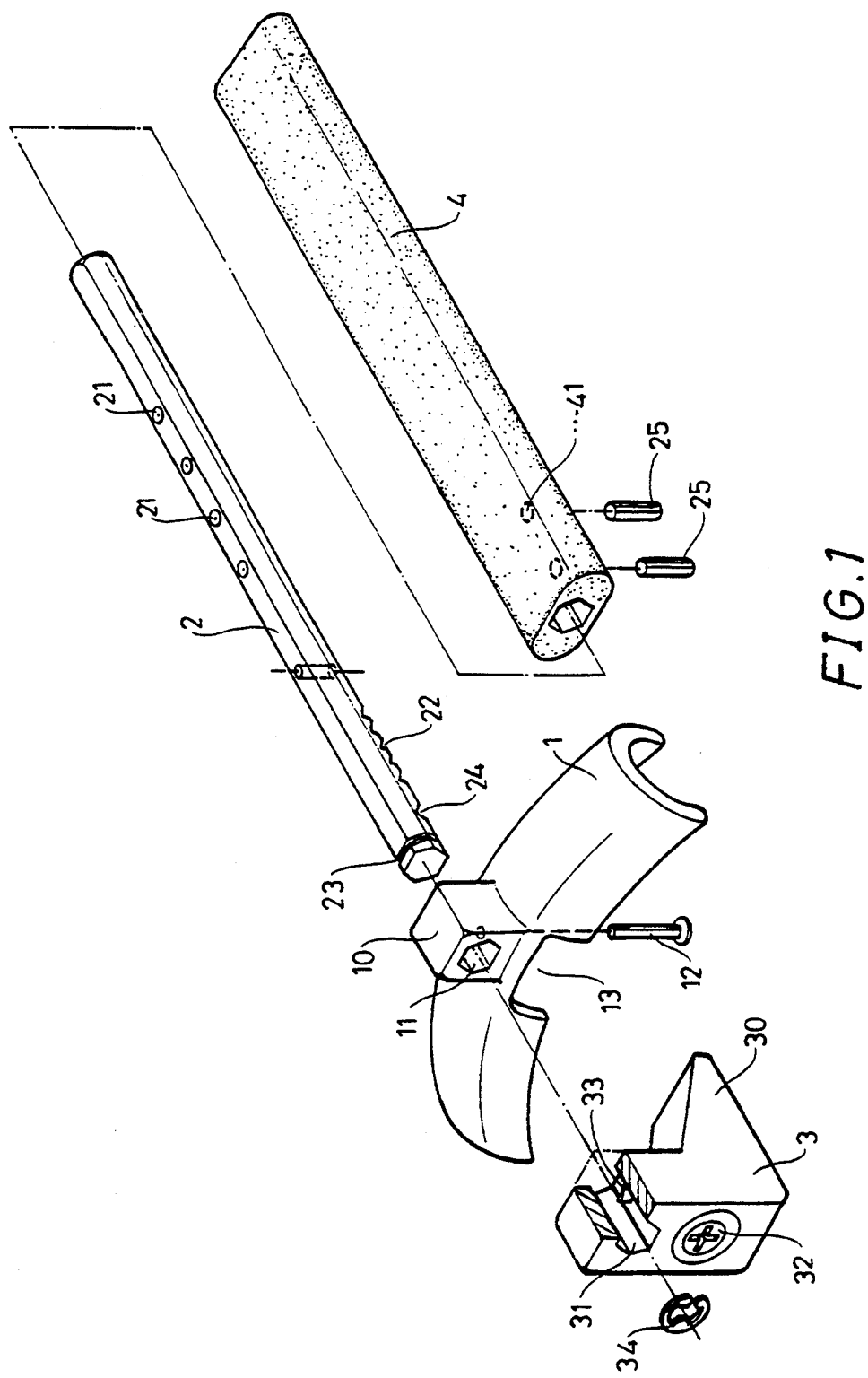
FIG. 1 is an exploded view of a locking device for a steering wheel in accordance with the present invention.
Figure 2:
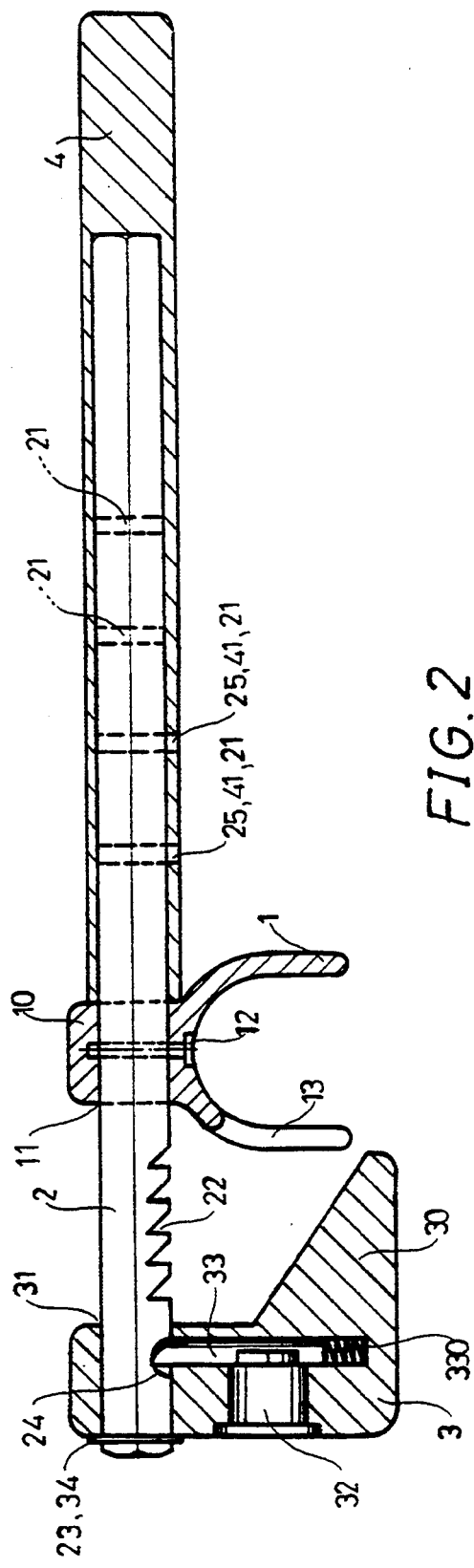
FIGS. 2 and 3 are cross sectional views illustrating the operation of the locking device.
Figure 3:
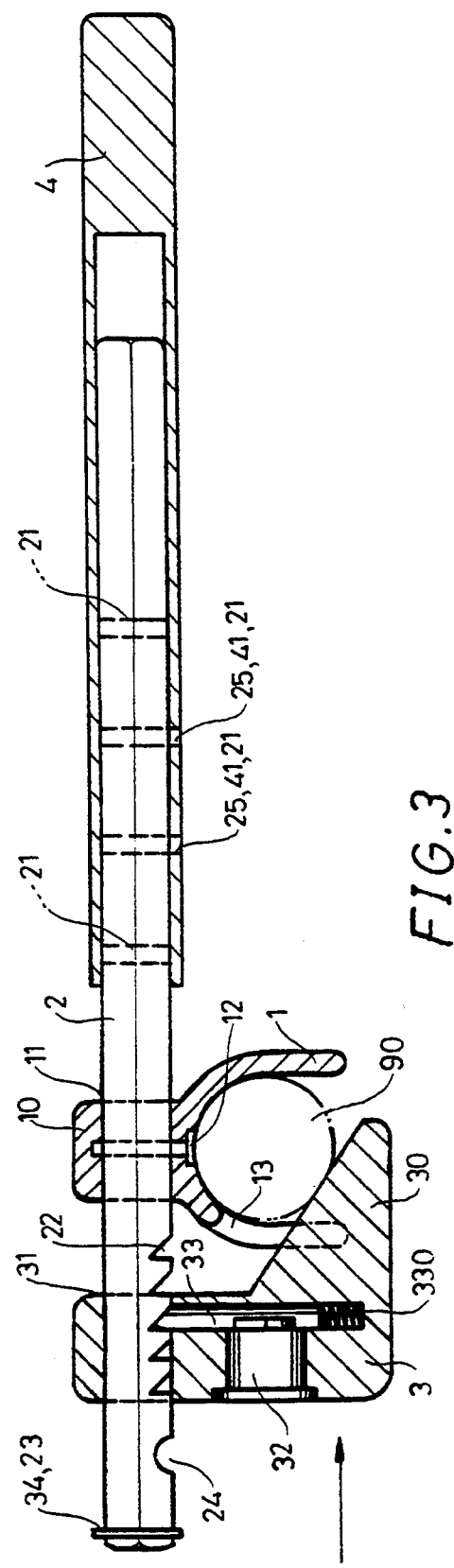
Figure 4:
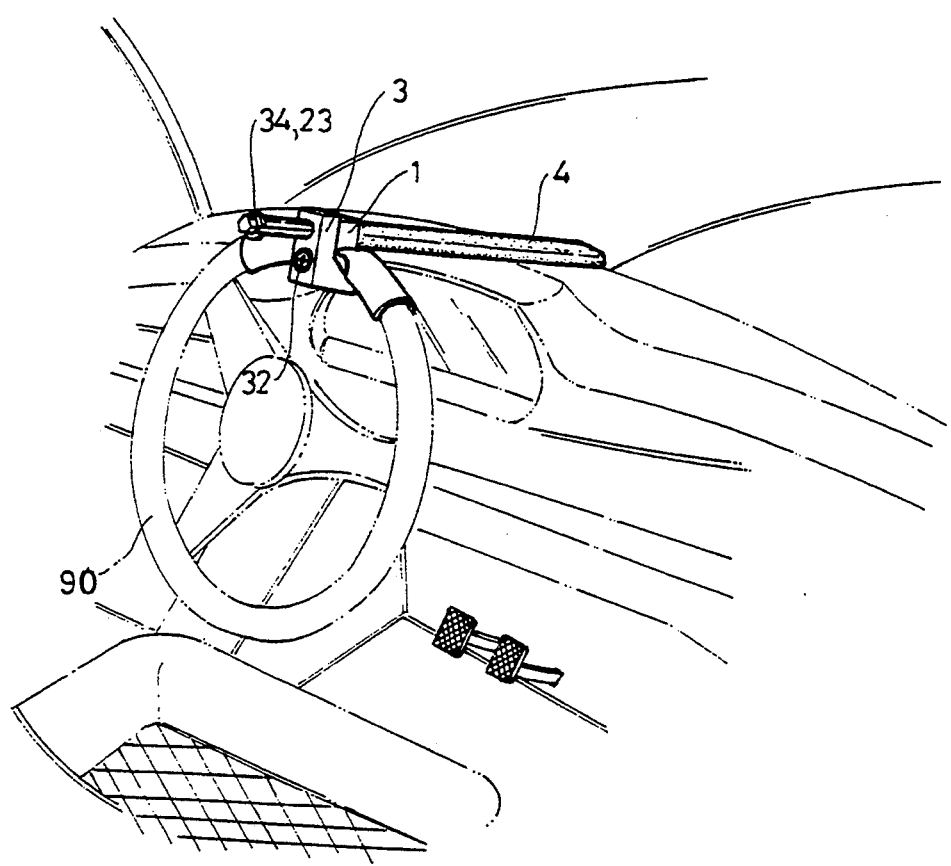
FIG. 4 is a perspective view illustrating the application of the locking device.

Referring to the drawings, and initially to FIGS. 1 and 2, a locking device in accordance with the present invention comprises a frame 1 having a shape corresponding to the steering wheel so as to be engaged on the steering wheel, best shown in FIG. 4, the frame 1 including a stub 10 extended upward therefrom, the stub 10 having an aperture 11 formed therein for receiving a stick 2 which is fixed to the frame 10 by a pin element 12, the frame 1 including a notch 13 formed therein; the stick 2 including a plurality of orifices 21 formed in the rear portion, a number of ratchet teeth 22, a depression 24 and an annular groove 23 formed in the front portion thereof: a sleeve 4 engaged on the stick 2 and including two holes 41 formed therein, one or more pins 25 engaged through the holes 41 of the sleeve 4 and the orifices 21 of the stick 2 so as to fix the sleeve 4 on the stick 2, and a block 3 including an opening 31 formed in the upper portion for receiving the stick 2, a clamping ring 34 engaged in the annular groove 23 of the stick 2 so as to prevent the block 3 from disengaging from the stick 2, the block 3 including a lock 32 disposed therein, and a catch 33 disposed in the block 3 and having an upper end extended upward into the opening 31 and having a spring 330 engaged to the lower end thereof such that the upper end of the catch 33 can be biased upward into the opening 31 the block 3 including an extension 30 for engaging in the notch 13 of the frame 1 (FIG. 3).

Referring to FIG. 2, when the upper end of the catch 33 is caused to engage with the depression 24 of the stick 2, the extension 30 of the block 3 is located beside the frame 1 such that the lower portion of the frame 1 is opened and can be engaged onto the steering wheel: however, when the block is moved toward the frame 1, the upper end of the catch 33 can be caused to engage with either of the ratchet teeth 22, at this moment, the extension 30 of the block 3 is caused to engage with the notch 13 of the frame 1 in order to lock the steering wheel 90 within the frame 1. The engagement between the upper end of the catch 33 and the ratchet teeth 22 prevents the block 3 from moving away from the frame 1 such that the steering wheel 90 can be solidly locked in place.

Referring next to FIG. 4, it is preferable that the sleeve 4 and the stick 2 are engaged on the control board of the vehicle, such that the locking device can not be rotated when the locking device is engaged on the steering wheel of the vehicle.

Accordingly, the locking device in accordance with the present invention includes a greatly simplified configuration, the manufacturing cost thereof is thus greatly reduced Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A locking device for locking a steering wheel of a vehicle comprising a stick with a longitudinal axis including at least one tooth formed in a first end thereof, an elongate frame Channel-shaped in cross-section fixed on a middle portion of said stick by a stub extending from the frame, the frame having a longitudinal axis perpendicular to the longitudinal axis of the stick for engaging over an arcuate portion of the steering wheel of said vehicle, said frame including a notch formed therein under the stub, a block slidably engaged on said first end of said stick and including a catch slidably disposed therein, an extension extended from said block and engaged with said notch of said frame when said block is moved toward said frame, said steering wheel being locked between said frame and said block when said extension of said block is engaged in said notch of said frame, and means biasing said catch upward to engage with said at least one tooth of said stick so as to lock said steering wheel in place.

2. A locking device for locking a steering wheel of a vehicle comprising a stick including at least one tooth formed in a first end thereof, a frame fixed on a middle portion of said stick for engaging with the steering wheel of said vehicle, said frame including a notch formed therein, a block slidably engaged on said first end of said stick and including a catch slidably disposed therein, an extension extended from said block and engaged with said notch of said frame when said block is moved toward said frame, said steering wheel being locked between said frame and said block when said extension of said block is engaged in said notch of said frame, and means biasing said catch upward to engage with said at least one tooth of said stick so as to lock said steering wheel in place, wherein said stick includes an annular groove formed in said first end thereof, and a clamping ring engaged in said annular groove so as to prevent said block from disengaging from said stick.

3. A locking device for locking a steering wheel of a vehicle comprising a stick including at least one tooth formed in a first end thereof, a frame fixed on a middle portion of said stick for engaging with the steering wheel of said vehicle, said frame including a notch formed therein, a block slidably engaged on said first end of said stick and including a catch slidably disposed therein, an extension extended from said block and engaged with said notch of said frame when said block is moved toward said frame, said steering wheel being locked between said frame and said block when said extension of said block, is engaged in said notch of said frame, and means biasing said catch upward to engage with said at least one tooth of said stick so as to lock said steering wheel in place, wherein said stick includes at least one orifice formed therein, and a sleeve engaged on said stick and having at least one hole formed therein, and at least one pin engaged in said at least one hole of said sleeve and said at least one orifice of said stick so as to fix said sleeve on said stick.

* * * * *